United States Patent [19]
Carter

[11] Patent Number: 5,528,983
[45] Date of Patent: Jun. 25, 1996

[54] APPARATUS FOR PRODUCING LAYERED PRODUCTS

[75] Inventor: Michael R. Carter, Fisherville, Ky.

[73] Assignee: F. B. Purnell Sausage Co., Inc., Simpsonville, Ky.

[21] Appl. No.: 464,955

[22] Filed: Jun. 5, 1995

[51] Int. Cl.$^6$ .............. A21D 13/08; A23L 1/31; B65B 25/16; G07F 11/70
[52] U.S. Cl. ............ 99/450.4; 99/450.7; 99/537
[58] Field of Search .............. 99/450.1–450.5, 99/450.6, 450.7, 494, 537, 538, 356, 357, 443 C, 477–479; 426/274, 524

[56] References Cited

U.S. PATENT DOCUMENTS

| | | | |
|---|---|---|---|
| 318,386 | 5/1965 | Jolly | 99/450.4 |
| 2,016,233 | 10/1935 | Herman | 99/450.5 |
| 3,645,197 | 2/1972 | McMeekin et al. | 99/450.4 |
| 3,762,306 | 10/1973 | Staples | 99/450.7 |
| 3,783,772 | 1/1974 | Fay | 99/450.4 |
| 4,060,027 | 11/1977 | Jenny | 99/450.1 |
| 4,153,656 | 5/1979 | Fay | 99/450.4 |
| 4,194,443 | 3/1980 | Mims | 99/450.4 |
| 4,202,260 | 5/1980 | Weger | 99/450.4 |
| 4,329,920 | 5/1982 | Rose et al. | 99/450.4 |
| 4,595,099 | 6/1986 | Zaruba et al. | 99/450.5 |
| 4,685,387 | 8/1987 | Hanson et al. | 99/450.1 |
| 4,944,218 | 7/1990 | Cresson | 99/357 |
| 5,101,716 | 4/1992 | Cones, Sr. et al. | 99/537 |
| 5,113,754 | 5/1992 | Robinson et al. | 99/443 C |
| 5,365,835 | 11/1994 | Naramura | 99/357 |

*Primary Examiner*—Timothy F. Simone
*Attorney, Agent, or Firm*—John E. Vanderburgh

[57] ABSTRACT

Apparatus for the automated assembly of sandwich items, such as biscuit and sausage sandwiches, consists generally of a frame on which are carried a slicing station, a separation station and an assembly station, all of which are automated. The slicing station includes slicing means for slicing into upper and lower sections the material which is to become the exterior layers of the layered product. At the separation station the upper section is removed from the lower section thus exposing the lower section for receiving the middle layer of the layered product. The assembly station includes of a pair of pneumatically operated transfer shuttles carrying a plurality of downwardly depending pickup cylinders which include extendible piston arms having suction cups on the depending end of each arm. The transfer shuttles are operable for depositing the middle material on the lower section of the exterior material and for relocating the upper sections of exterior material on the lower sections to complete the assembly of the layered product. In one embodiment the transfer shuttles also remove the top layer prior to deposition of the middle layer so that the separation station is combined with the assembly station. The apparatus further includes a main conveyor for carrying the exterior material through the slicing, separation and the assembly stations and a second conveyor for carrying the middle material to the assembly station.

14 Claims, 6 Drawing Sheets

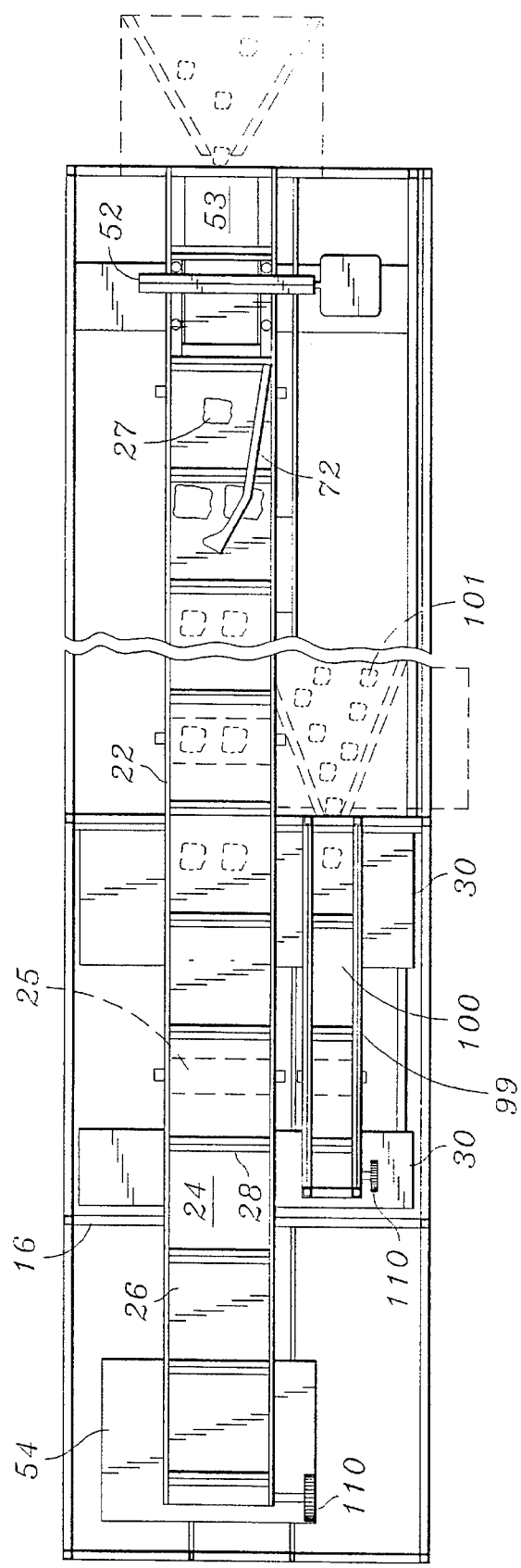
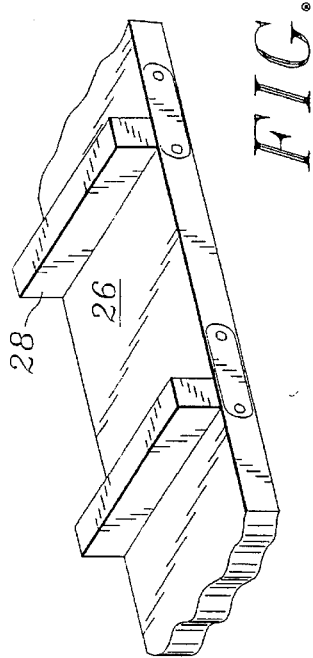

APPARATUS FOR PRODUCING LAYERED PRODUCTS

FIELD OF THE INVENTION

The invention relates to apparatus for the production of layered items and more particularly to automated apparatus for the production of layered food products such as biscuit and sausage patty sandwiches.

BACKGROUND OF THE INVENTION

Pre-packaged, generally frozen, sandwich products have become increasingly popular as quick lunch items and even breakfast items which may be ready to eat or which can be defrosted and heated in a microwave quickly and conveniently. The production of such sandwich products has been traditionally a highly labor intensive operation requiring manual assembly of the sandwich components.

Automated apparatus is available and is commonly used in the bakery industry for the production of various layered baked goods, such as for example cookies which have upper and lower sections and a filling in between. Normally the outer surface of the cookie sections is provided with a design which must be maintained on the outer surfaces of the finished product. Accordingly, such machines require the use of pick up wheels or the like which are primarily concerned with the taking of already separated cookie sections and inverting one section with respect to the other so as to be properly positioned for assembly over the filler material which is then deposited on the bottom cookie. Other types of machines for the automated production of pizza and similar products are not suited for sandwich making since they are not concerned with slicing and separating the sandwich materials and reassembling the materials into a sandwich.

Accordingly, it is highly desirable to provide an automated sandwich assembly mechanism which is reliable and which can produce sandwiches at a relatively high production rate.

SUMMARY OF THE INVENTION

In accordance with the invention the apparatus consists generally of a frame on which are carried a slicing station, a separation station and an assembly station, all of which are automated. The slicing station includes slicing means for slicing into upper and lower sections the material which is to become the exterior layers of the layered product. The separation station includes means for removing the upper section from the lower section thus exposing the lower section for receiving the middle layer of the layered product. The assembly station incorporates automated means including transfer shuttles having pickup cylinders for the deposition of the middle layer of material on the exposed surface of the lower section of the outer layer material and for replacing the upper section of the exterior layer material over the middle layer to complete assembly of the layered product. The apparatus further includes a main conveyor for carrying the exterior material through the stations of the apparatus and a second conveyor for carrying the middle material to the assembly station. The main conveyor and the second conveyor are driven by a common drive means and control means is provided to regulate the time and frequency that the conveyers are driven so that the period of operation of the conveyers is the same. The period of operation is determined by the number and spacing of the pickup cylinders carried by the transfer shuttles and the conveyor speed and the time it takes to move a corresponding number of unassembled items into alignment under the corresponding pickup cylinders at a given conveyor speed. The period of operation of the conveyers is the same through all stations In more detail, the assembly station includes of a pair of pneumatically operated transfer shuttles carrying a plurality of downwardly depending pickup cylinders which include extendible piston arms having suction cups on the depending free end of each arm. The transfer shuttles are operable for transferring the middle material from the second conveyor and depositing it on the lower section of the exterior material and for locating the upper sections of exterior material on the lower sections to complete the assembly of the layered product. Means are provided to create a negative pressure in the suction cups to generate sufficient suction to allow the suction cups to pick up an item for transfer to the lower sections on the main conveyor.

In one embodiment of the invention the transfer shuttles move in tandem from a start position with a first transfer shuttle aligned over corresponding middle material items on the second conveyor in the assembly station and a second transfer shuttle aligned over corresponding lower sections on the main conveyor in the assembly station. The pickup cylinder piston arms of the first shuttle are extended so that the suction cups contact the corresponding middle material items and the arms are retracted with the items secured to the suction cups. The transfer shuttles move in tandem to a second position where the first shuttle is aligned over corresponding lower sections and the second shuttle is aligned over corresponding upper sections in the assembly station. The second shuttle picks up the upper sections while the first shuttle deposits the middle material on the corresponding lower sections of exterior material. The shuttles return to the start position and the second shuttle deposits the upper sections on the middle material layer to complete the assembly of the layered products. The drive means is activated to simultaneously drive the main conveyor and the second conveyor to move the assembled products out of the assembly station and to move middle material and upper and lower sections of exterior material into alignment under the transfer shuttles in the assembly station.

In another embodiment of the invention, the transfer shuttles operate independently. The upper and lower sections of the exterior material are not separated prior to the assembly station. The second shuttle, while at its start position, first removes the upper section of the exterior material from the lower section and moves transversely away from its start position over the lower section to make room for the first shuttle. The first shuttle operates from its start position as described above to transfer the middle material from the second conveyor to a corresponding lower section on the main conveyor and then moves back to its start position. The second shuttle returns to its start position and deposits the top sections on the corresponding lower sections to complete assembly of the layered product. In this manner the separation station is combined with the assembly station.

The invention will be more fully understood from the following description of the preferred embodiments and the drawings.

BRIEF DESCRIPTION OF THE DRAWINGS

FIG. 2 is a schematic top plan view of the apparatus of FIG. 1;

FIG. 13 is a perspective view of a portion of the main conveyor.

DESCRIPTION OF THE PREFERRED EMBODIMENT

The device will be described hereinafter in conjunction with the production of biscuit and sausage sandwiches, however, it will understood that the apparatus of the present invention is not so limited.

Figure 1:
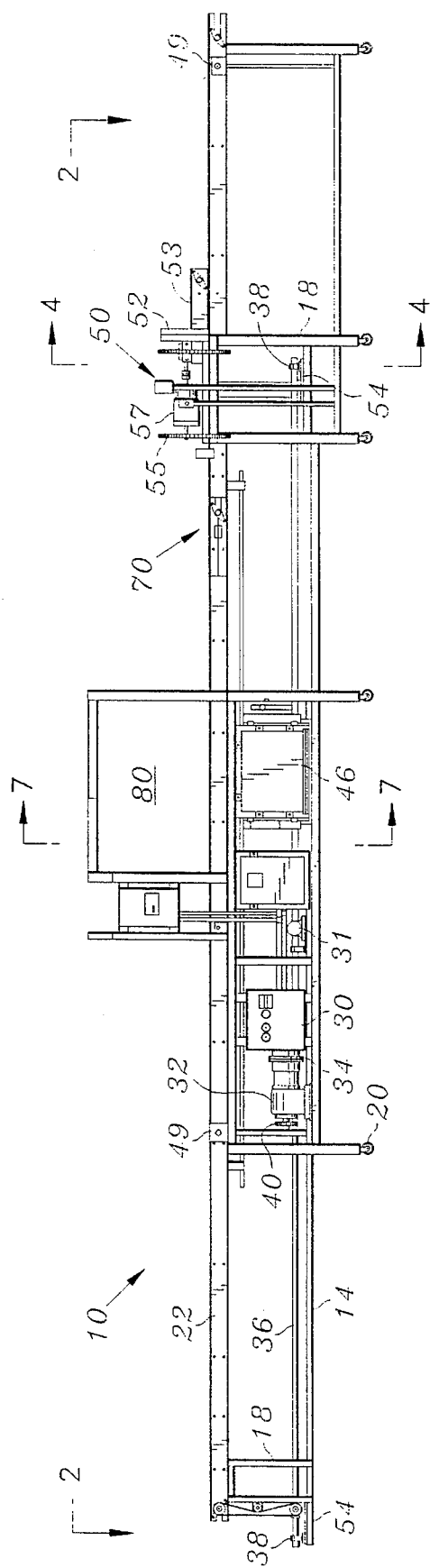
FIG. 1 is a schematic side elevation of the apparatus of the present invention.
Figure 3:
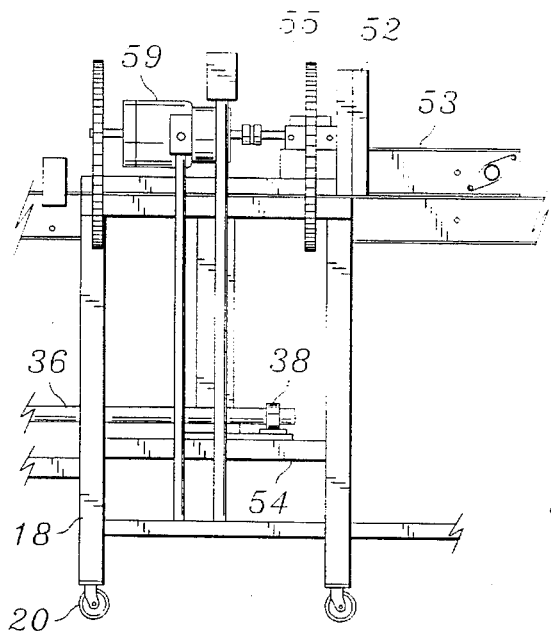
FIG. 3 is a side view in enlarged scale of a portion showing in greater detail the slicing station of the apparatus of FIG. 1.

Referring to FIGS. 1, 2, and 3, the apparatus of the present invention, shown generally as 10, includes a frame 12 consisting of longitudinal stringers 14 and transverse members 16 which are supported by vertical supports 18. Although not essential, it is preferred that the frame 12 be sectioned and joined by suitable securing means such as bolts so that the unit can be disassembled for shipping purposes. The contacting ends of the vertical supports 18 may be provided with casters 20 so that the apparatus 10 can be conveniently moved on the floor. Mounting plates are carried by the frame 12 on which are supported the various motors and components for operating the apparatus as described below.

A longitudinal channel 22 extends essentially the length of the frame 12 in which is disposed a main conveyor 24. A series of rollers 25 are journaled in the channel 22 for supporting the main conveyor 24. The main conveyor 24 consists of an endless belt made up of flat sections 26 which are hinged together. One transverse edge of each section 26 is perpendicularly extended to form an upright 28 which aids in aligning a biscuit 27 on the section 26 of the conveyor 24. The height of the upright is less than one half of the thickness of the biscuit being conveyed.

An electric motor 31 is carried on a mounting plate 30 and is connected to a reduction transmission 32, also carried on a mounting plate 30, through a clutch 34. The output of the reduction transmission 32 is translated to a drive shaft 36 which is journaled in bearings 38 mounted on platforms 54 at either end of the frame 12 and at intermediate locations along the drive shaft through a main drive sprocket 40 on the reduction transmission 32 which is connected by a drive chain (not shown) to a sprocket (not shown) on the drive shaft.

Arranged along the frame 12 are the automated stations for carrying out the various operations required in forming the sandwich. A slicing station, shown generally as 50 includes a slicer 52 for slicing the biscuits. The sliced biscuits are then carried by the conveyor 24 to a separator station, shown generally as 70, and then to an assembly station, shown generally as 80, where the ingredients are placed on the bottom section of the biscuit and the top is placed thereover to complete assembly of the sandwich. In one embodiment of the invention the separator station 70 and the assembly station 80 are combined in a single location, as will be explained in greater detail below. The assembled sandwiches are then moved to conventional packaging equipment or they may be manually packaged, if desired.

A housing 46, which is carried on the frame, contains the electronics and circuitry which controls the clutch 34 for sequentially driving the conveyor and for controlling the timing and speed of the conveyor 24 and the components of the assembly station 80. In addition, emergency stop controls 49 are provided at several positions on the apparatus 10 to shut down the apparatus in the event of an emergency or malfunction.

Figure 4:
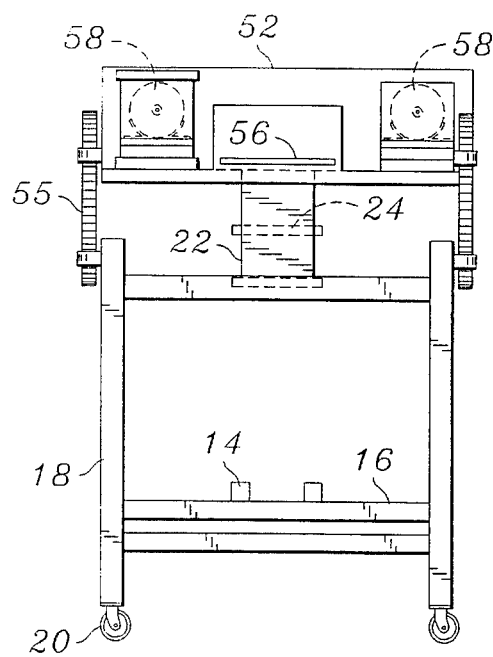
FIG. 4 is an end view of the slicing station of FIG. 3.

The slicing station 50 is shown in more detail in FIGS. 3 and 4. A mounting platform 54 is secured between the upright supports 28 of the frame 12 and carries a journal bearing 38. One end of the drive shaft 36 is supported by the journal bearing 38 carried on the platform 54. The frame 12 also supports a slicer 52 which includes an endless blade 56 carried by a spaced apart pair of pulleys 58, of which one pulley is driven by a motor 59. The motor 59 and slicer 52 are carried on a mounting platform 57 which includes threaded adjustment members 55 for raising and lowering the mounting platform 57 and slicer 52 to adjust the height of the blade 56. The height of the slicer blade 56 is normally set to slice the biscuit into upper and lower halves of essentially equal thickness.

Figure 5:
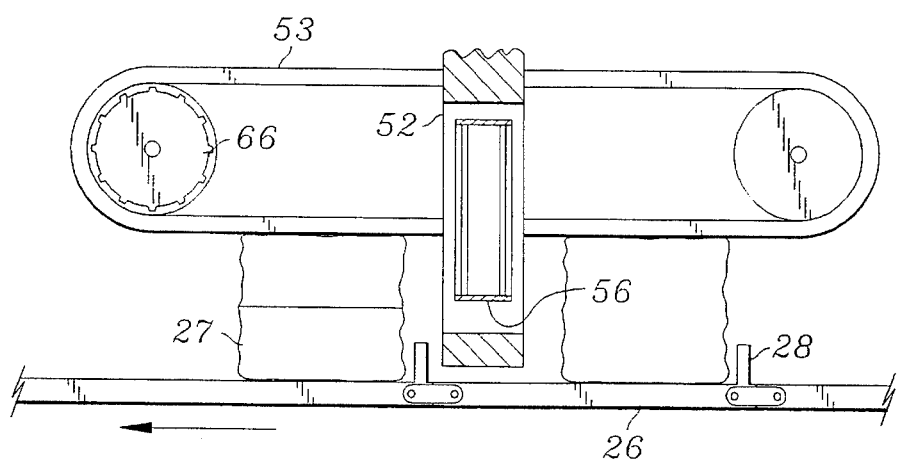
FIG. 5 is an enlarged scale side view, partially end section, of the drive mechanism of the top belt of the slicing station of FIG. 1.

An upper, endless flat belt 53 is spaced above the main conveyor 24 and extends through the slicer 52 so that the slicer blade 56 is disposed between the upper flat belt 53 and the main conveyor. The upper belt 53 is also vertically adjusted by the threaded adjustment members 55. The upper belt 53 contacts the upper surface of the biscuit and supports the biscuits to prevent tilting or rotation as they move through the slicer 52. The upper belt 53 is driven off of the drive shaft 36 by translating the drive shaft rotation through a power takeoff 60 (FIG. 11) and drive sprocket 62 which drives a chain 64 and upper belt drive sprocket 66 (FIG. 5).

In the embodiment shown in FIGS. 1 and 2, the separation station 70, that is the area where the upper section of the biscuit is separated from the lower section, consists of a biased arm 72 extending across the main conveyor 24. The biased arm 72 contacts the upper section of the biscuits to cause the upper sections to move laterally away from the bottom sections as the conveyor advances. The conveyor 24 is sufficiently wide so that the upper and lower sections of the biscuits can be aligned side by side on the conveyor as they enter the assembly station 80.

Figure 6:
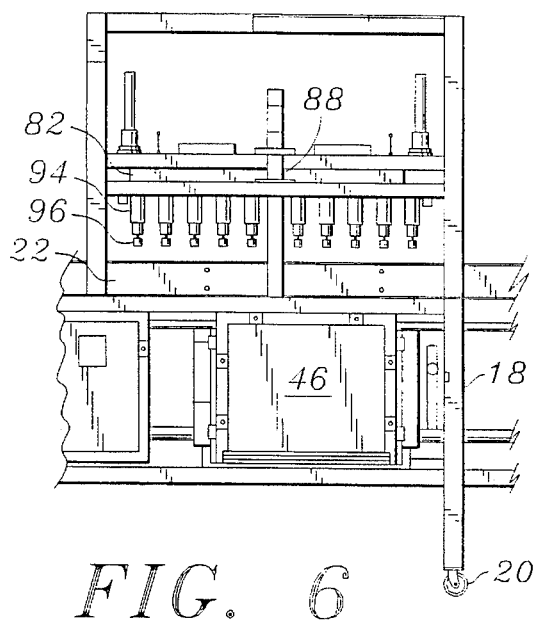
FIG. 6 is a side view of the assembly station of FIG. 1 in enlarged scale.
Figure 7:
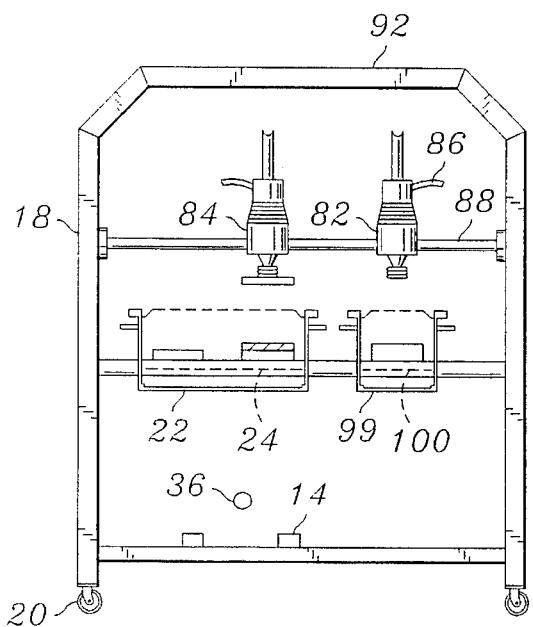
FIG. 7 is an end view of the assembly station of FIG. 6 illustrating the pick up shuttles in the start position.
Figure 8:
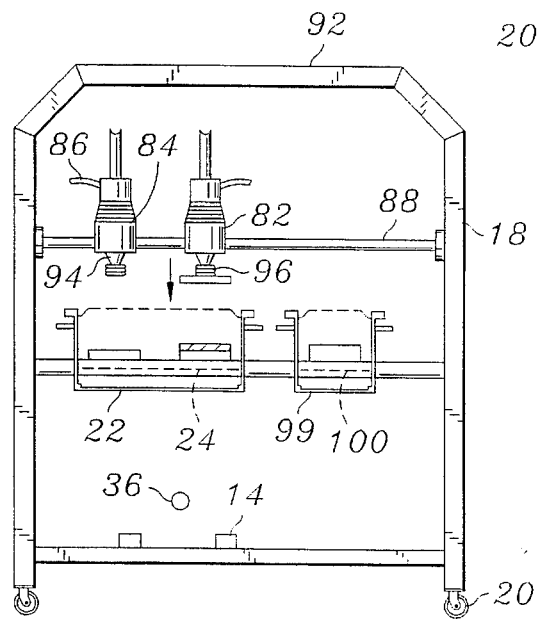
FIG. 8 is an end view of the assembly station of FIG. 6 illustrating the pick up shuttles during the assembly operation.

Referring to FIGS. 6, 7, and 8, the assembly station 80 comprises a pair of transfer shuttles, 82 and 84, connected to a vacuum and pneumatic source (not shown) by means of hoses 86. The transfer shuttles, 82 and 84, are mounted for tandem transverse movement on guide supports 88 which are carried by the upright members 28 of the frame 12. The transfer shuttles 82 and 84 are driven by a pneumatic cylinder 90. The upright members 28 of the frame 12 at the assembly station 80 are extended above the guide supports 88 and lateral cross members 92 extend between them for carrying panels(not shown) for enclosing the assembly station 80. Downwardly depending pneumatic pickup cylinders 94, each having an extendible piston arm 95, are carried by the transfer shuttles, 82 and 84 and communicate with the pneumatic source and the vacuum source through the hoses 86. The depending free end of each piston arm 95 terminates in a flexible suction cup 96.

A second conveyor 100 in a channel 99 is constructed and driven in the same manner as the main conveyor 24 and extends parallel to the main conveyor 24 for carrying the meat patties to the assembly station 80. The second conveyor 100 is moved simultaneously with the main conveyor 24 so that a patty carried by the second conveyor is aligned with a biscuit lower section under each pickup cylinder 94 in the assembly station 80.

As shown in FIGS. 7 and 8, the transfer shuttles, 82 and 84, are movable along the guide supports 88 transversely to the longitudinal axis of the main conveyor 24. The transfer shuttle 82 moves alternately between a position over the second conveyor 100 and a position over the main conveyor 24 in alignment with the bottom sections of the biscuits. Similarly the transfer shuttle 84 moves between a first position over the top sections on the main conveyor 24 and bottom sections. The arms 95 of the pickup cylinders 94 extend to bring the suction cups 96 into contact with patties on the conveyor 100 and the biscuit upper sections on the main conveyor 24 whereupon the drawing of suction and retraction of the pickup cylinder piston arm 95 picks an object from the conveyor.

Figure 11:
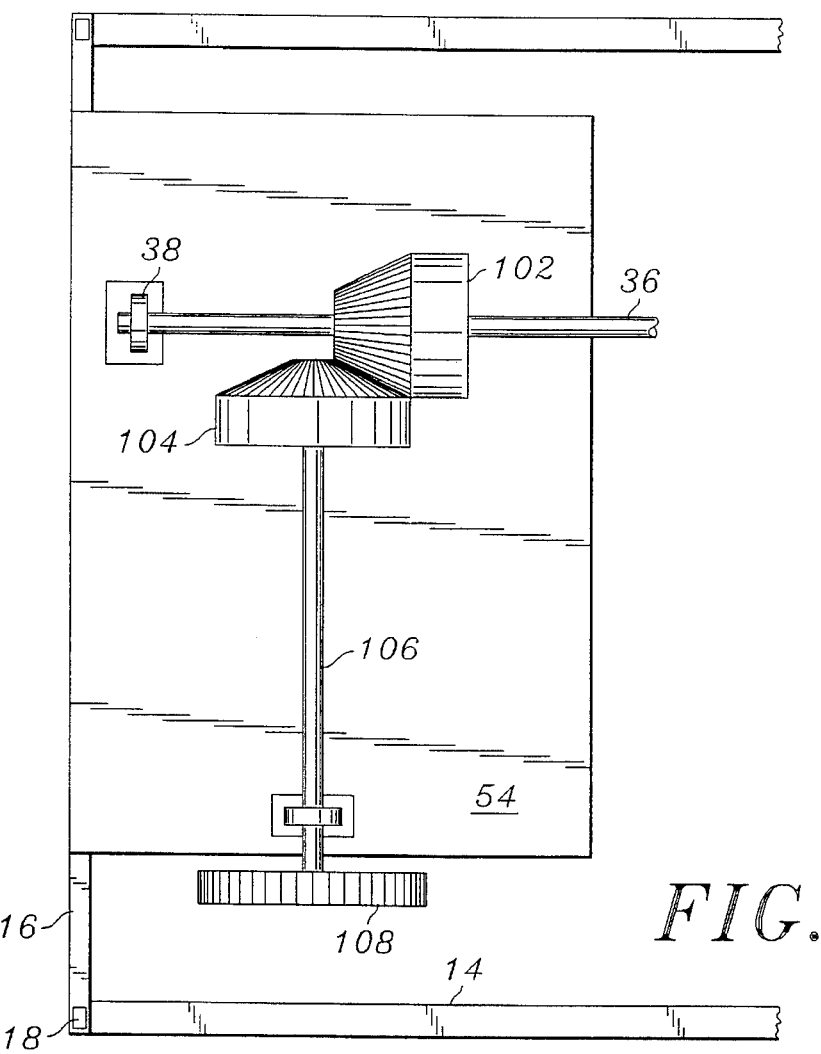
FIG. 11 is a detail of the transfer drive system for driving the conveyor belts of the apparatus of FIG. 1.
Figure 12:
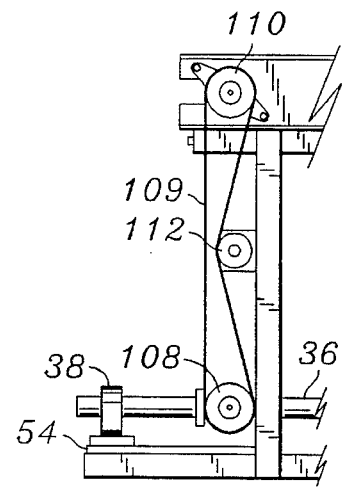
FIG. 12 is a side view in enlarged scale of the drive system for the main conveyor belt of the apparatus of FIG. 1.

The conveyors 24 and 100 are both driven by the drive shaft 36 through a power takeoff 60. Referring to FIGS. 11 and 12, the power takeoff 60 comprises a bevel gear system which is illustrated in FIG. 11 in conjunction with driving the main conveyor 24. However, it will be understood that identical power takeoffs 60 and drive systems are provided for driving the second conveyor 100 and the belt 53 at the slicing station. As illustrated, the drive shaft 36 carries a first bevel gear 102 which translates its rotational energy to a belt drive bevel gear 104. The translated motion is carried through a drive shaft 106 to the chain drive sprocket 108. A chain 109 connects the chain drive sprocket 108 with the conveyor drive sprocket 110 and an idler sprocket 112 is provided for taking up slack in the chain 109.

In operation, the biscuits are loaded onto the main conveyor 24 from a suitable hopper and are pushed into contact with the main conveyor 24 through guide rails defining a V(not shown) which serve to funnel the biscuits into a single line for pick up by the main conveyor 24. The biscuits are conveyed through the slicer 52 where they are sliced into upper and lower sections. The biscuits then move in contact with the wiper arm 72 which is spaced above the main conveyor 24 to contact the upper section of the biscuit only. The upper section is cammed away from the lower section and onto the main conveyor 24 along side of the lower section. The wiper arm 72 tends to push the biscuit upper section back against an upright 28. The camming action also tends to drag the lower section of the biscuit against the upright 28 so that the upper and lower sections of each biscuit are essentially aligned by the upright 28 side by side on the main conveyor 24. The clutch 34 is controlled to engage and disengage the motor 31 and the reduction transmission 32 to drive the main conveyor 24 forward in sequential steps. The timing of the engagement of the reduction transmission 32 and thus the length of period of movement of the conveyor is set in the controller and is dependent upon the size of the transfer shuttles 82 and 84 and the number of pick up cylinders 94 carried by the transfer shuttles.

Simultaneously with loading of the biscuits, the sausage patties are loaded onto a suitable surface adjoining the second conveyor 100 and are fed onto the second conveyor 100 through guide rails similar to those employed for loading the biscuits to insure that the sausage patties are loaded one at a time onto the second conveyor. Since the main conveyor 24, the second conveyor 100 and the top belt are driven from the common drive shaft 36, all three move sequentially at the same time so as to insure that the biscuits and the sausage patties are aligned under corresponding pneumatic pickup cylinders 94.

As illustrated in FIG. 7, the initial position of the shuttle 84 is over the biscuit lower sections on the main conveyor 24 while the shuttle 82 is positioned over the second conveyor 100 carrying the sausage patties. The shuttle 82 is activated first and the piston arms 95 of the pickup cylinders 94 are extended so that the suction cups 96 come into contact with the sausage patties. The piston arms 95 of the pickup cylinders 94 are retracted to lift the sausage patty. Responsive to the extension of the pneumatic cylinder 90 the transfer shuttles 82 and 84 then move in tandem transversely on the guide supports 88 bringing transfer shuttle 82 into alignment over the lower sections of the biscuits on the main conveyor 24. The piston arms 95 of the pickup cylinders 94 are extended to drop the patty on the biscuit lower section when the vacuum is terminated. Preferably termination of the vacuum is accompanied by a short burst of air which breaks the suction and frees the patty from the suction cup. The piston arms 95 of the pickup cylinders 94 of the transfer shuttle 84 are extended to permit the suction cups 96 to contact the biscuit tops and are retracted to lift the tops. The transfer shuttles 82 and 84 then move in tandem back into their initial position bringing transfer shuttle 84 carrying the upper sections of the biscuits back into alignment over lower sections on which the patties are deposited and the transfer shuttle 82 aligned over the second conveyor 100. The piston arms 95 of the pickup cylinders 94 of the transfer shuttle 84 are extended and the suction is terminated to deposit the biscuit upper sections over the patty to complete assembly of the sausage biscuit sandwiches in the assembly station 80.

Upon completion of the assembly operation, the clutch 34 again engages the motor 31 and reduction transmission 32 and the conveyors 24 and 100 move forward to bring new biscuit and patty elements into alignment with the pickup cylinders 94 of the transfer shuttles 82 and 84. The completed sandwiches are transferred to conventional packaging machines or are packaged manually for shipping.

It will be understood that the biscuits and the sausage patties, particularly the biscuits, are not always uniformly shaped and perfect alignment of the assembled components is not always achieved. However, as the components move toward the packaging equipment a brush or curtain can be employed to align of the sausage patty with the upper and lower sections of the biscuit. Alternatively, the process of packing the sandwich will also result in alignment of the components.

Figure 9:
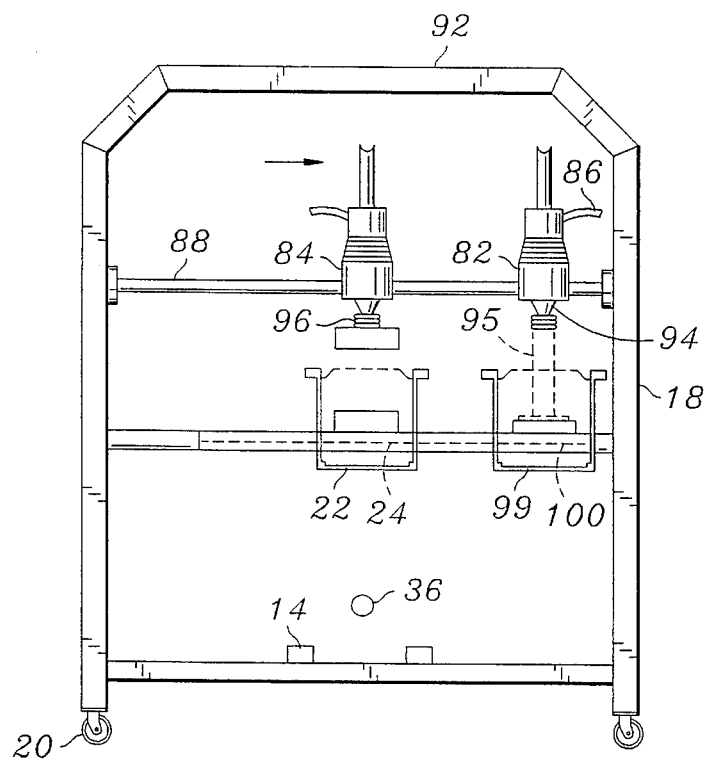
FIG. 9 is an enlarged scale end view of the assembly station in another embodiment of the invention illustrating the pick up shuttles during the first step of the assembly operation.
Figure 10:
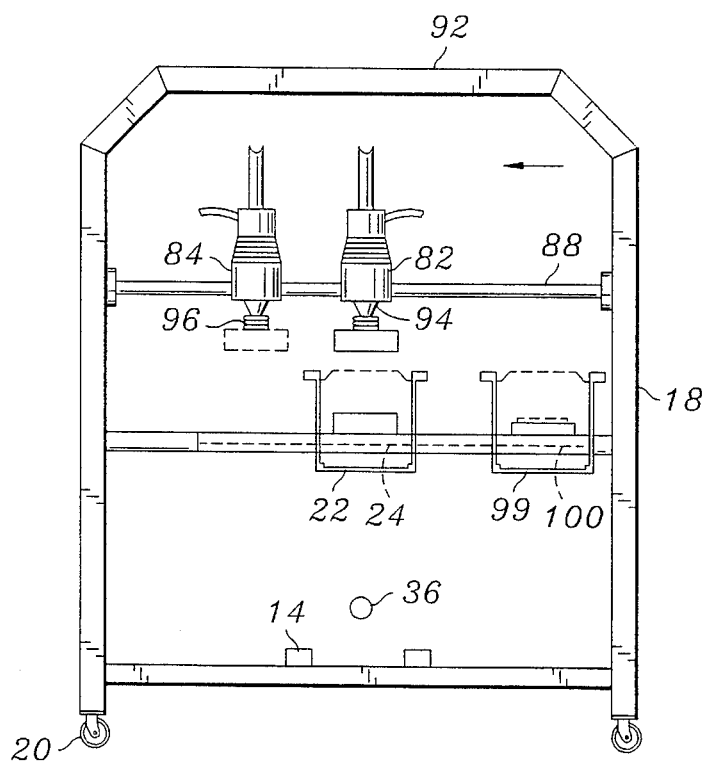
FIG. 10 is an end view of FIG. 9 illustrating the transfer shuttles in a second step of the assembly operation.

While the foregoing embodiment of the invention is highly suited for its purpose, at times there is problem separating the upper and lower sections of the biscuit due to the high coefficient friction between the biscuit sections. FIGS. 9 and 10 illustrate another embodiment of the device of the present invention in which the separation station 70 and the assembly station 80 are combined in a single location. The structure of the device is otherwise the same as described in conjunction with FIGS. 1 through 8.

FIG. 9, in which like reference numbers denote like elements, illustrates the initial position of the transfer shuttles 82 and 84 as the biscuits leave the slicing station 50 and are carried by the main conveyor 24 to the combined separation station 70 and assembly station 80. The sausage patties are conveyed by the second conveyor 100 and a patty is aligned with each unseparated biscuit in the manner previously described. The patties and biscuits are brought into the assembly station and aligned under the suction cups 96 of the pickup cylinders 94. Initially the transfer shuttle 84 is positioned on the guide supports 88 over the main conveyor 24 and the transfer shuttle 82 is positioned over the second conveyor 100 carrying the sausage patties. The piston arms 95 of the pickup cylinders 94 on the transfer shuttle 84 are extended to contact and lift away the top section of the biscuit and the transfer shuttle 84 moves, tranversly in a direction away from the second conveyor 100 to make room over the main conveyor 24 for the transfer shuttle 82. The piston arms 95 of the pickup cylinders 94 of the transfer shuttle 82 are then extended to pick up the sausage patties aligned thereunder. The transfer shuttle moves transversely to the main conveyor 24 to a second position with the sausage patties carried by the piston arms 95 are aligned over the corresponding lower sections of the biscuit. The piston arms 95 of the pickup cylinders 94 of the transfer shuttle 82 extend and a burst of air breaks the suction at the suction cup 96 and the patties are deposited on the corresponding lower sections of the biscuit. Both of the transfer shuttles 82 and 84 then move transversely on the guide supports 88 back into their initial start position with the transfer shuttle 84 carrying the biscuit top positioned over the sausage patties on the biscuit lower sections. The piston arms 95 of the pickup cylinders 94 are then extended and a burst of air breaks the vacuum at the suction cup 96 and deposits the upper section of the biscuit over the sausage patty. The clutch 34 mechanism engages the motor 31 and the reduction transmission 32 and the conveyors move forward taking the assembled biscuits out for packaging and bringing new biscuits and sausage patties for assembly. In this embodiment the wiper arm is eliminated thus avoiding problems associated with sliding the upper section over the lower section during separation.

The apparatus of the present invention automates the sandwich making operation and is able to produce sandwiches at a substantially high rate of production. Manual operation is essentially eliminated except where loading and packaging may require manual operation. The device of the present invention, however, is readily adapted for combination with automated loading and packaging apparatus which does not form a part of this invention. While the invention has been described in conjunction with the assembly of biscuit and sausage sandwiches, it will be understood that is equally applicable to the automated production of other types of sandwiched or layered products where separation of a top and bottom component to make room for the insertion of a middle component followed by replacement of the top component is required.

As will be understood by those skilled in the art, various arrangements which lie within the spirit and scope of the invention other than those described in detail in the specification will occur to those persons skilled in the art. It is therefor to be understood that the invention is to be limited only by the claims appended hereto.

Having described the invention, I claim:

1. Apparatus for the continuous automated assembly of layered products consisting of upper and lower sections of exterior material and a middle material sandwiched therebetween, said apparatus comprising:
   a. a frame;
   b. main conveyor means supported by said frame for carrying said exterior material though said apparatus;
   c. second conveyor extending parallel to said main conveyor means for carrying said middle layer material through said apparatus;
   d. means for separating said exterior material into upper and lower sections to expose the lower section of said exterior material for receiving the middle layer of the layered product;
   e. an assembly station carried by said frame including shuttle means for transferring said middle layer material from said second conveyor means and for depositing said middle layer material on said lower section of said exterior material;
   f. drive means for driving said first and second conveyors; and
   g. means for controlling said drive means and said transfer shuttles.

2. The apparatus of claim 1 wherein said drive means comprises a common drive shaft and control means is provided to regulate the time and frequency that the conveyors are simultaneously driven so that the period of operation of the conveyors is the same.

3. The apparatus of claim 1 wherein said assembly station includes at least one pneumatically operated transfer shuttle, said shuttle being transversely movable with respect to said main conveyor means and carrying a plurality of pickup means for grasping components of said layered product.

4. The apparatus of claim 3 wherein said pickup means comprises at least one pickup cylinder, said pickup cylinder including a piston having a downwardly depending extendible piston arm defining a free end, said piston arm having a suction cup on said depending free end, said suction cup communicating with means for drawing suction.

5. The apparatus of claim 1 wherein said assembly station includes a pair of pneumatically operated transfer shuttles, said shuttles moving in tandem transversely with respect to said main conveyor means, each said shuttle carrying a plurality of pickup means for grasping and transferring components of said layered product.

6. The apparatus of claim 1 wherein said assembly station includes first and second pneumatically operated transfer shuttles carrying a plurality of pickup means and being independently movable with respect to one another, said first one of said transfer shuttles being movable between a start position with said pickup means aligned over said second conveyor means and a transfer position with said pickup means aligned over said main conveyor means, said second one of said transfer shuttles being movable between a start position with said pickup means disposed over said main conveyor means and a holding position transversely away from said main conveyor means and said second conveyor means.

7. Apparatus for the continuous automated assembly of sandwiches consisting of a meat patty disposed between upper and lower biscuit sections, said apparatus comprising:
   a. a frame comprising longitudinal, lateral and upright members;

b. a main conveyor supported by said frame for carrying said biscuits though said apparatus;

c. means for receiving and feeding whole biscuits onto said main conveyor means;

d. a second conveyor extending parallel to said main conveyor for carrying said meat patties through said apparatus;

e. means for receiving and feeding said meat patties on to said second conveyor means;

f. slicer means carried by said frame for slicing said whole biscuits into upper and lower sections;

g. means for separating said upper biscuit section from a respective lower biscuit sections to expose said lower sections for receiving a meat patty;

h. an assembly station carried by said frame including transfer shuttle means for transferring said meat patties from said second conveyor means and for depositing said meat patties on corresponding lower biscuit sections in said assembly station and for replacing said upper biscuit sections on respective lower sections thereby sandwiching said meat patty there between;

i. drive means for simultaneously driving said first and second conveyors; and j. means for controlling said drive means and said transfer shuttles.

8. The apparatus of claim 7 wherein said slicing means is supported on a mounting platform carried by said frame, said mounting platform being secured to said frame by threaded adjustment members for vertically adjusting said platform and said slicing means to slice said biscuits into upper and lower sections of essentially equal thickness.

9. The apparatus of claim 7 wherein said means for separating said upper biscuit sections from respective lower biscuit sections consists of a biased arm extending across said main conveyor means, said biased arm being spaced above said main conveyor means for contact with said upper biscuit section to cam said upper biscuit sections laterally away from said respective bottom sections as said conveyor advances said biscuits.

10. The apparatus of claim 7 wherein said frame at said assembly station carries a pair of spaced apart guide supports and said transfer shuttle means comprises a first and a second transfer shuttle body mounted on said guide supports for tandem transverse movement with respect to said main conveyor, said first and second transfer shuttle bodies being driven by a pneumatic cylinder, said transfer shuttle bodies carrying a plurality of downwardly depending pneumatic pickup cylinders, each said cylinder having a piston and an extendible and retractable piston arm defining a free end, a flexible suction cup being disposed on said free end of said depending piston arm communicates with means for creating a negative pressure within said suction cup.

11. The apparatus of claim 10 wherein said transfer shuttles move in tandem from a start position to a second position and back to said start position, said start position consisting of said pickup cylinders of said first transfer shuttle aligned over said second conveyor in the assembly station and said pickup cylinders of said second transfer shuttle aligned over said main conveyor in the assembly station, said second position consisting of said pickup cylinders of said first transfer shuttle aligned over said main conveyor and said pickup cylinders of said second transfer shuttle being located over said main conveyor transversely from said start position.

12. The apparatus of claim 10 wherein said transfer shuttles move independently of one another from a start position to a second position and back to said start position, said start position consisting of said pickup cylinders of said first transfer shuttle being aligned over said second conveyor and said pickup cylinders of said second conveyor being aligned over said main conveyor, said second position consisting of said pickup cylinders of said first transfer shuttle being located over said main conveyor and said second transfer shuttle being moved transversely away from said main conveyor and said second conveyor.

13. The apparatus of claim 10 wherein said main conveyor and said second conveyor are driven by a common drive means.

14. The apparatus of claim 10 wherein said main conveyor consists of an endless belt made up of hinged sections, each said section defining an essentially flat biscuit carrying surface and one transverse edge of each said section being perpendicularly extended to form an upright, said upright being extended to a height above said surface less than one half of the thickness of said biscuits being conveyed.

* * * * *